United States Patent [19]
Ito et al.

[11] Patent Number: 5,183,013
[45] Date of Patent: Feb. 2, 1993

[54] TWO-CYCLE DIESEL ENGINE

[75] Inventors: Hideaki Ito; Masanori Miyamoto, both of Iwata, Japan

[73] Assignee: Yamaha Hatsudoki Kabushiki Kaisha, Iwata, Japan

[21] Appl. No.: 590,003

[22] Filed: Sep. 28, 1990

[30] Foreign Application Priority Data

Sep. 29, 1989 [JP] Japan ................. 1-253929

[51] Int. Cl.⁵ ............................................. F02B 75/04
[52] U.S. Cl. ...................... 123/48 R; 123/65 PE; 123/78 R; 123/501
[58] Field of Search ........... 123/501, 502, 449, 65 PE, 123/65 A, 65 V, 190 A, 48 R, 78 R

[56] References Cited

U.S. PATENT DOCUMENTS

| | | | |
|---|---|---|---|
| 3,254,636 | 6/1966 | Faust | 123/78 A |
| 3,970,056 | 7/1976 | Morris | 123/78 R |
| 4,121,552 | 10/1978 | Mithuo et al. | 123/65 A |
| 4,141,324 | 2/1979 | Karaba | 123/78 R |
| 4,202,297 | 5/1980 | Oku et al. | 123/65 A |
| 4,622,943 | 11/1986 | Braun et al. | 123/449 |
| 4,625,684 | 12/1986 | Van Avermaete | 123/78 A |
| 4,633,842 | 1/1987 | Ikeda et al. | 123/501 |
| 4,658,793 | 4/1987 | Bonin | 123/501 |
| 4,660,514 | 4/1987 | Nerstrom | 123/65 PE |
| 4,672,924 | 6/1987 | Hiasa et al. | 123/65 PE |
| 4,722,310 | 2/1988 | Igashira et al. | 123/501 |
| 4,748,958 | 6/1988 | Ash et al. | 123/502 |
| 4,753,211 | 6/1983 | Hofer | 123/449 |
| 4,756,292 | 7/1988 | Mischke et al. | 123/501 |
| 4,760,830 | 8/1988 | Bullis et al. | 123/501 |
| 4,760,831 | 8/1988 | Altdorf | 123/501 |
| 4,763,630 | 8/1988 | Nagase et al. | 123/501 |
| 4,778,358 | 10/1988 | Pape | 123/502 |
| 4,819,606 | 4/1989 | Kawano | 123/502 |
| 4,834,031 | 5/1989 | Katoh et al. | 123/48 R |
| 4,841,936 | 6/1989 | Takahashi | 123/501 |
| 4,854,289 | 8/1989 | Eheim et al. | 123/449 |
| 4,873,947 | 10/1989 | Ryan, III et al. | 123/78 C |
| 4,920,932 | 5/1990 | Schlunke | 123/65 PE |
| 4,977,882 | 12/1990 | Nakamura et al. | 123/449 |
| 4,998,512 | 3/1991 | Masuda et al. | 123/65 PE |
| 5,000,131 | 3/1991 | Masuda | 123/65 PE |

FOREIGN PATENT DOCUMENTS

| | | | |
|---|---|---|---|
| 0069426 | 6/1981 | Japan | 123/502 |
| 0230524 | 11/1985 | Japan | 123/78 R |
| 0230527 | 11/1985 | Japan | 123/78 R |
| 2099084 | 12/1982 | United Kingdom | 123/502 |

Primary Examiner—E. Rollins Cross
Assistant Examiner—Thomas N. Moulis
Attorney, Agent, or Firm—Ernest A. Beutler

[57] ABSTRACT

A two-cycle diesel engine and means for operating it to improve the performance by increasing the compression ratio by the closing of a supplemental exhaust port under light loads and low speeds. In order to reduce combustion chamber temperature and reduce nitrous oxide emissions, the injection timing is advanced an additional increment during the closing of the supplemental exhaust port. Various control strategies are described which involve either quickly raising the compression ratio and retarding the injection timing.

20 Claims, 9 Drawing Sheets

TWO-CYCLE DIESEL ENGINE

BACKGROUND OF THE INVENTION

This invention relates to a two-cycle diesel engine and more particularly to an improved arrangement for operating a two-cycle diesel engine to improve performance and increase emission control.

The fuel efficiency of diesel engines is well known. Although being fuel efficient, diesel engines do present certain problems, particularly with exhaust emission control. Because of their inherent high efficiency, diesel engines tend to have a higher amount of nitrous oxides ($NO_x$) in their exhaust gases. In addition, under certain running conditions, the existence of carbon, hydrocarbon or carbon monoxide in the exhaust can be a problem.

A further objection to diesel engines is the particular noise which they generate under some running conditions. Because of the fact that a diesel engine begins combustion by self ignition due to the high compression ratio, a diesel engine may, at times, provide a knocking noise which some individuals may find to be objectionable. In order to overcome these disadvantages, it has been proposed to provide an arrangement for varying the compression ratio of the engine. With such variable ratio systems, a higher compression ratio is employed at low speeds and low loads and a reduced compression ratio is permitted at higher speeds and loads so as to reduce or control the aforenoted objectionable characteristics. With a two-cycle, crankcase compression, diesel engine, this can be done by providing an exhaust port timing control wherein the opening of the exhaust port is delayed at light loads and mid-range and is advanced under high speed operation. This changing of the timing of the opening and closing of the exhaust port has been found to be quite effective in overcoming the aforenoted disadvantages. However, even with such an arrangement, it has been found in the transition period immediately prior to or during the change of timing that certain of these objectionable characteristics may be encountered.

It is, therefore, a principal object of this invention to provide an improved diesel engine.

It is a further object of this invention to provide an improved arrangement for reducing the temperature in the combustion chamber of a diesel engine under certain running conditions.

It is a further object of this invention to provide an improved arrangement for operating a diesel engine so as to reduce objectionable characteristics under all running conditions.

It is a further object of this invention to provide the aforenoted advantages in an two-cycle, crankcase compression, diesel engine.

SUMMARY OF THE INVENTION

This invention is adapted to be embodied in a diesel engine having a fuel injector for injecting fuel into the combustion chamber, and having means for increasing the compression ratio under low and mid-range conditions. In accordance with the invention, means are provided for reducing the temperature in the combustion chamber under the transition period when the change in compression ratio is initiated so as to avoid deleterious effects.

DETAILED DESCRIPTION OF THE PREFERRED EMBODIMENTS

Figure 1:
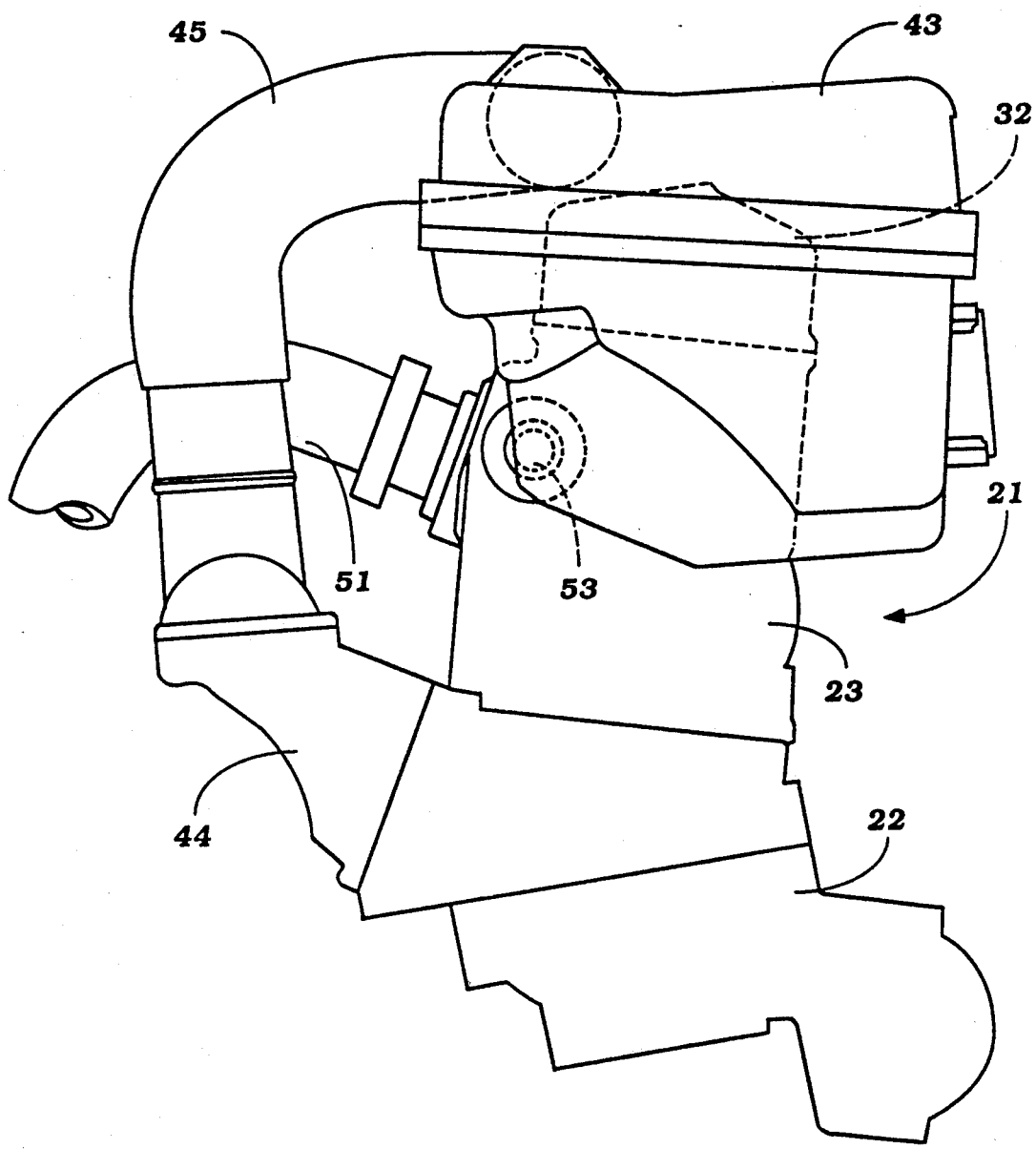
FIG. 1 is a front plan view of a two-cycle, crankcase compression, diesel engine constructed and operated in accordance with an embodiment of the invention.
Figure 2:
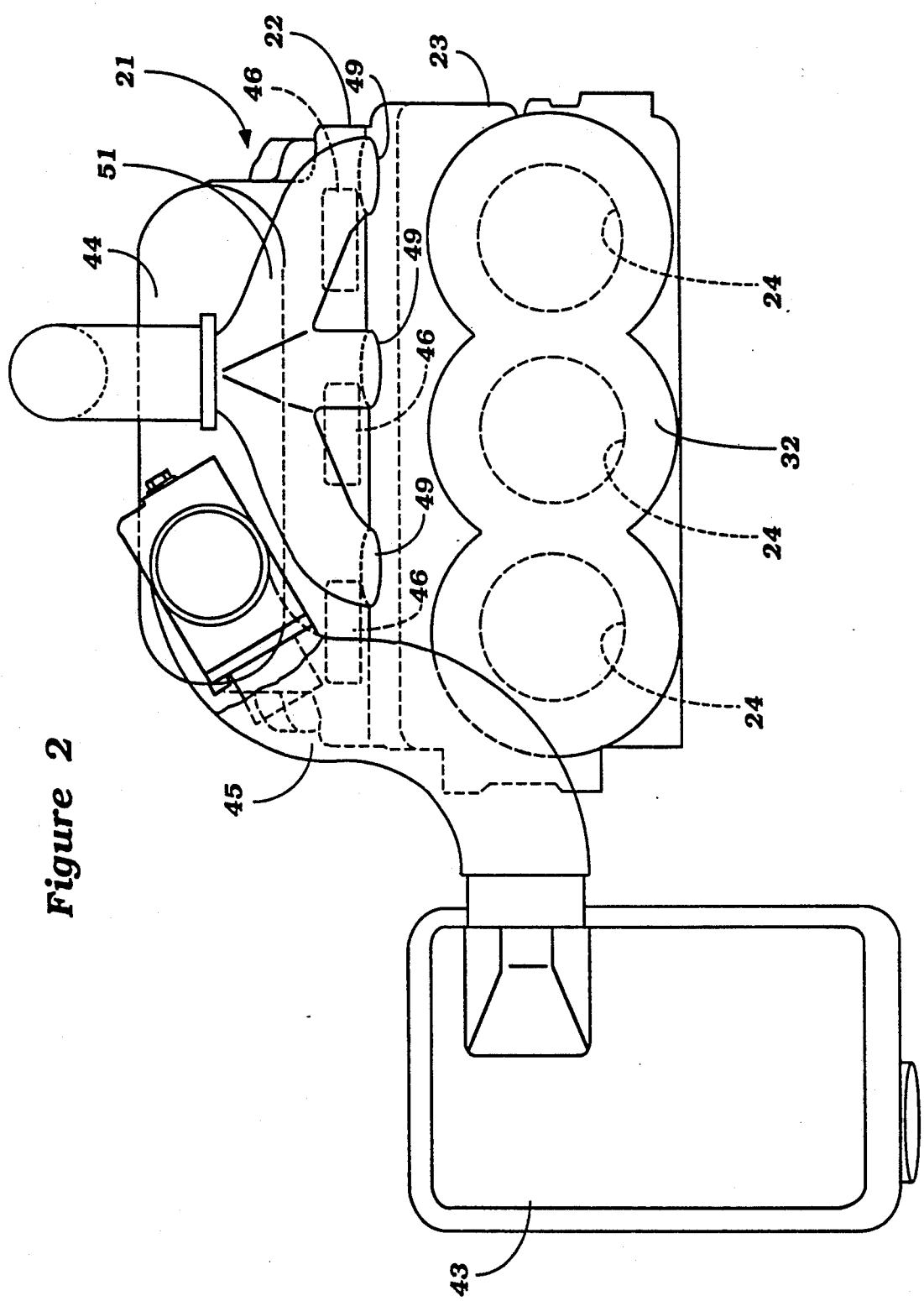
FIG. 2 is a top plan view of the engine.

Referring now in detail to the drawings and initially primarily to FIGS. 1 through 5, a two-cycle, diesel engine operating on the crankcase compression, two-stroke principle and constructed in accordance with an embodiment of the invention is identified generally by the reference numeral 21. In the illustrated embodiment, the engine 21 is designed primarily for automotive application. It is to be understood, however, that the invention can be utilized in conjunction with other applications for such engines and that certain facets of the invention can be employed with engines other than diesel engines operating on the two-stroke principle. However, the invention has particular utility with such engines.

The engine 21 includes a crankcase assembly 22 that is connected to the lower end of a cylinder block 23. In the illustrated embodiment, the engine 21 is of the three cylinder inline type and to this end the cylinder block 23 is provided with three parallel cylinder liners 24 that define cylinder bores 25. Although the invention is described in conjunction with a three cylinder in-line type engine, it should be readily apparent to those skilled in the art how the invention can be practiced in conjunction with engines having different cylinder numbers and different cylinder orientations. In fact, certain facets of the invention can be employed with engines of the rotary type.

Pistons 26 are slidably supported in each of the cylinder bores 25 and are connected by means of connecting rods 27 to throws 28 of a crankshaft 29 which is rotatably journaled in the crankcase 22 in a known manner. Individual crankcase chambers 31 are formed within the crankcase 22 and are sealed from each other in a suitable manner, as is typical with crankcase compression type engines.

A cylinder head assembly 32, which is comprised of a two-piece construction, is affixed to the cylinder block 23 by threaded fasteners 33. The two-piece construction of the cylinder head 32 permits the formation of a precombustion or torch chamber 34 which communicates with a main combustion chamber 35 formed above the head of the piston 26 through a restricted throat 36. A liner 37 may be formed on the underside of the lower cylinder head portion and the throat 36 may be formed in a separate insert piece.

A fuel injector, indicated generally by the reference numeral 38, is provided in the cylinder head 32 for discharge into each prechamber 24 and is supplied with high pressure fuel from a timing and injection pump 39 which is shown in most detail in FIGS. 4 and 5 and will be described later by particular reference to these figures. A supply line 41 connects the timing and injection pump 39 with each of the injectors 38 and only the connection to a single injector is shown in FIG. 5.

A glow plug 42 is provided in the cylinder head 32 for each prechamber 34 and operates in a known manner.

An air charge for running of the engine 21 is provided from an air cleaner and silencer 43 which, in turn, supplies air to an intake manifold 44 through a conduit 45. The manifold 44 communicates this air charge to the individual crankcase chambers 31 through inlet passages 46 formed in a side of the crankcase 22 and in which reed type check valves 47 are provided. The reed type check valves, as is well known in this art, are provided so as to insure against reverse flow when the intake air charge is compressed in the crankcase chambers 31.

The compressed charge is then transferred to the area above the piston 26 as the piston moves downwardly toward its bottom dead center position through one or more scavenge passages 48. This charge is then further compressed in the combustion chamber 35 and prechamber 34 and after the fuel injector 38 begins its injection, the fuel will ignite due to the high pressure and temperature of this charge and burn to drive the piston 26 downwardly in a well known manner.

Burnt charge is then discharged to the atmosphere through a main exhaust port 49 that extends through the cylinder block 23 and which communicates with an exhaust manifold 51 and exhaust system including a muffler (not shown) for discharge of the exhaust gases to the atmosphere.

Figure 3:
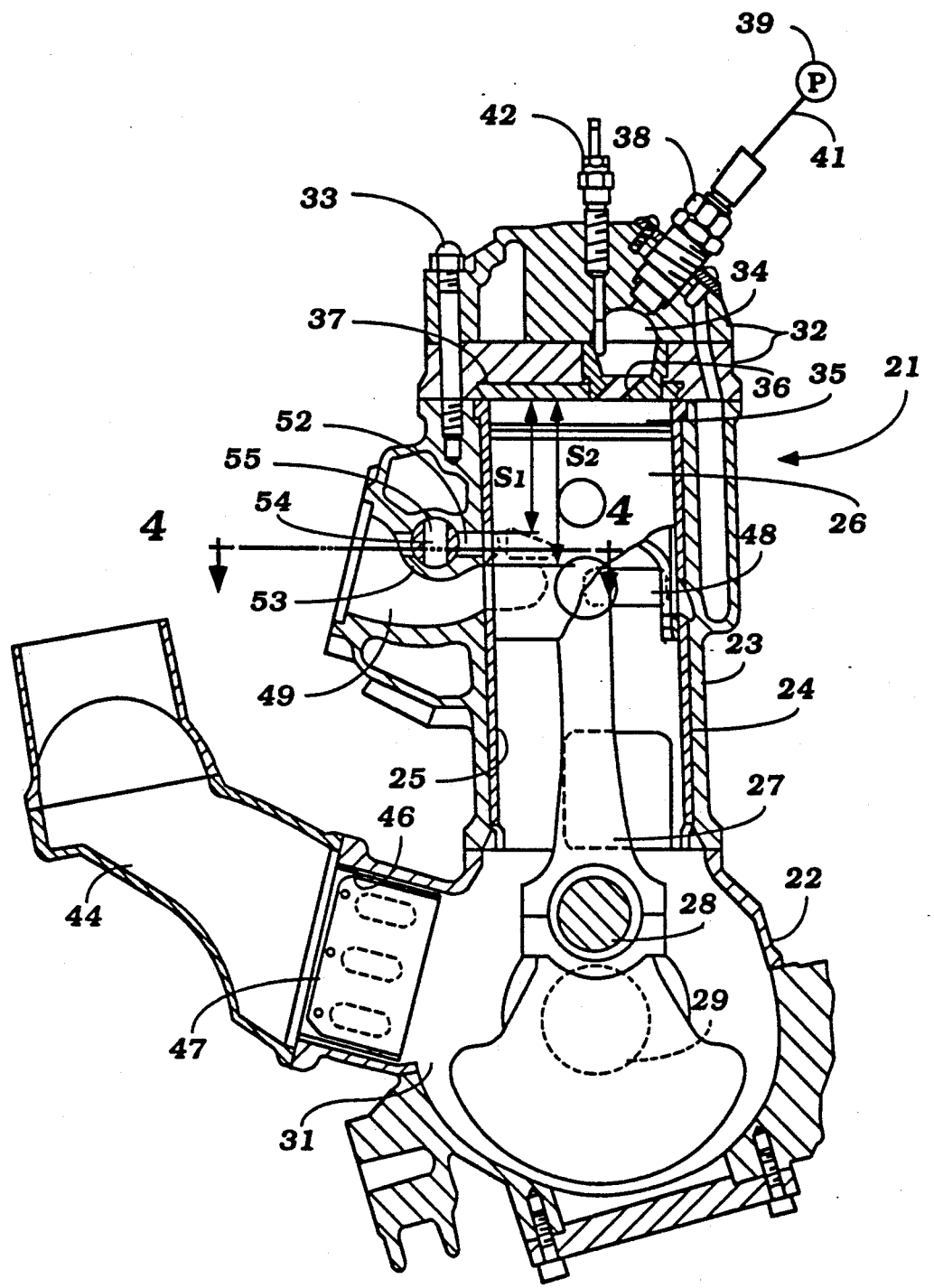
FIG. 3 is a cross-sectional view taken along a plane parallel to the plane of FIG. 1 and through one of the cylinder bores.

An auxiliary or sub-exhaust port 52 is formed in a projection 53 of the cylinder block 23 which extends into the main exhaust port 49 and which may be formed by a drilled passage extending through the outer opening of the main exhaust port 49 as should be readily apparent from FIG. 3. A rotary type valve 54 having a flow opening 55 is journaled within the auxiliary exhaust port 52 for controlling the opening and closing of the communication of the port 52 with the main exhaust port 49. FIG. 3 shows the construction in its closed position. In this position, the main exhaust port 49 will not be opened until the piston 26 has descended a distance $S_2$ from the lower surface of the cylinder head and, hence, the engine will have a relatively high effective compression ratio. However, when the exhaust control valve 54 is rotated to its opened position so that the passage 55 communicates the port 52 with the main exhaust port 49, the exhaust timing will open once the piston has descended the lesser distance $S_1$ or at an earlier time than when the exhaust control valve 54 is closed. This will result in a reduction in the compression ratio. The point at which the compression ratio is altered will be discussed later in conjunction with the description of the remaining figures.

Figure 4:
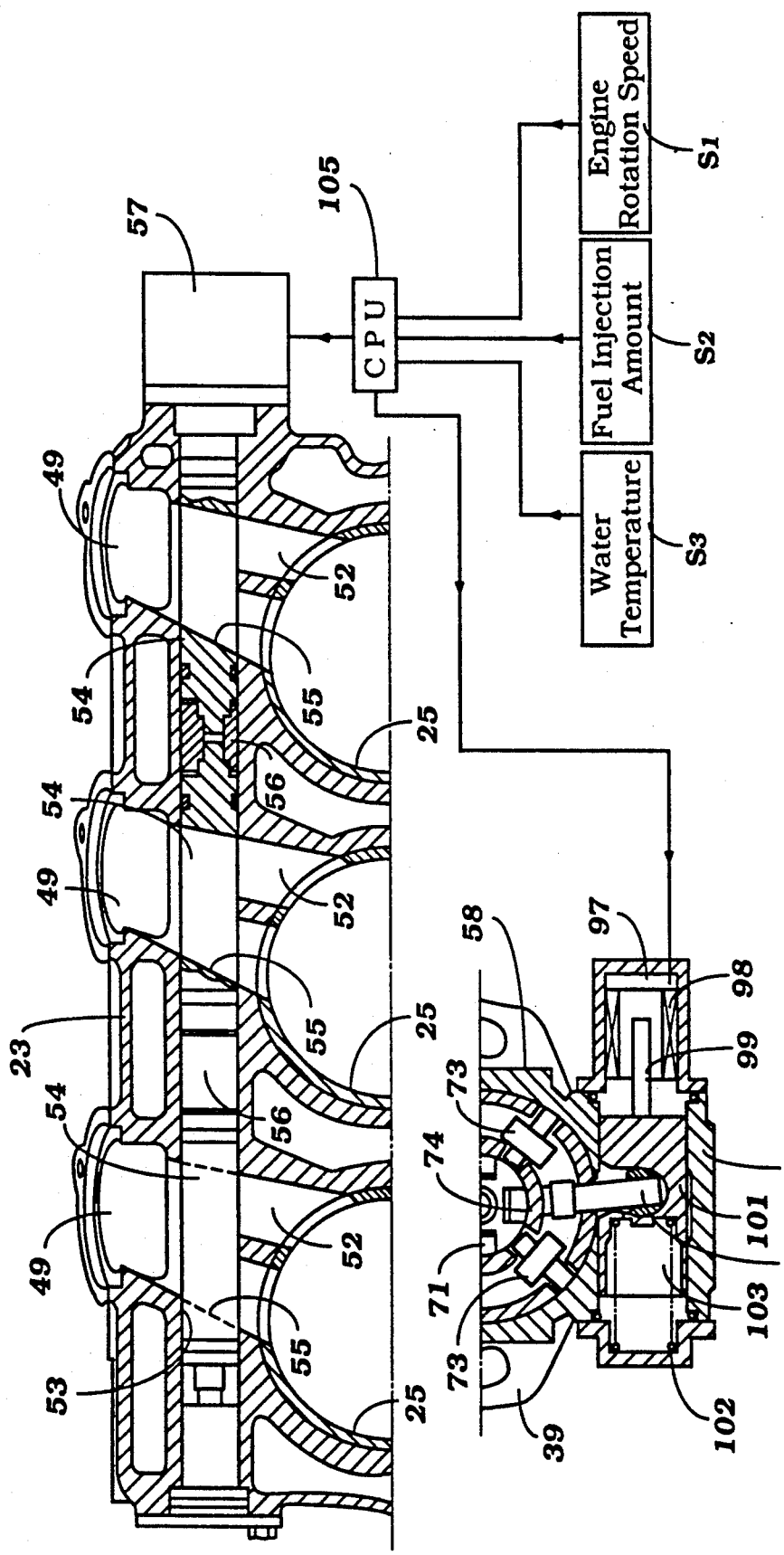
FIG. 4 is an enlarged cross-sectional view taken in part along the line 4—4 of FIG. 3 to show the exhaust control valve and in part through the fuel injection unit to show the construction for altering the injection timing.
Figure 5:
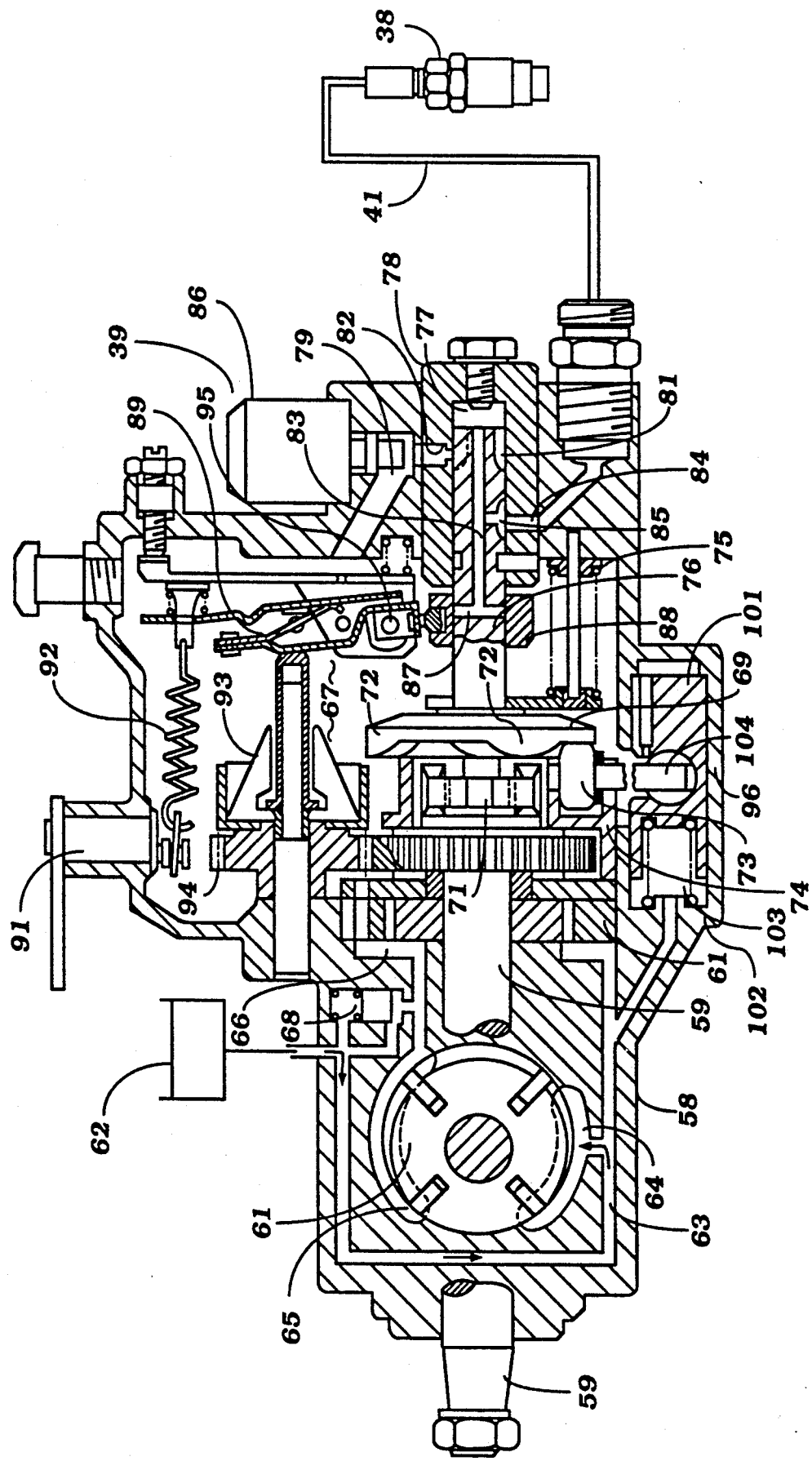
FIG. 5 is an enlarged cross-sectional view taken through the fuel injection unit and showing its relationship to one of the fuel injectors.

As may be best seen in FIG. 4, the exhaust control valves 54 comprise individual valve segments, each associated with a respective one of the cylinder bores 25. These valve segments are connected to each other by means of a coupling assembly, indicated generally by the reference numeral 56 which coupling assembly permits some axial movement between the individual valves to compensate for thermal expansion while insuring that the angular or rotary position of the valves 54 are all the same. An actuator element 57 which may comprise a stepping motor or the like is operated by a CPU 58 to open and close the exhaust control valves 54 in accordance with the strategy which will be discussed.

The fuel injection and timing pump 39 will now be described in detail by particular reference to FIGS. 4 and 5. This pump includes a housing assembly 58 in which a drive shaft 59 is rotatably journaled in an appropriate manner. The drive shaft 59 is coupled to be driven by the engine crankshaft 29 in a suitable manner. Since the engine 21 is of the two-cycle type, the shaft 59 is driven at crankshaft speed. As will become apparent, the pump 39 delivers three pressure pulses, one to each of a respective outlet for supplying each injector 38 during a single rotation of the drive shaft 59.

Affixed to the drive shaft near one end thereof is the impeller or rotor 61 of a low pressure pump of the sliding vane type. This pump is shown rotated through 90° at the left hand side of FIG. 5 so as to clearly show its construction. Fuel is drawn from a fuel tank 62 through an inlet line 63 in the housing 58 which communicates with the suction side 64 of the pump 61. The pressure or discharge side 65 of the pump communicates through an internal passageway 66 with a low pressure chamber 67 formed within the housing 58. A pressure regulating valve 68 communicates the pressure line 66 with the supply line 63 so as to maintain a predetermined regulated pressure in the low pressure chamber 67.

A cam disk 69 is supported for rotation within the housing 58 and is coupled for rotary movement with the drive shaft 59 through a splined coupling 71 which permits the cam disk 69 to reciprocate relative to the drive shaft 59. The cam disk 69 has three individual lobes 72 which are adapted to engage rollers 73 journaled for rotation about a transverse axis on a carrier 74. When the lobes 72 engage the rollers 71, the cam disk 69 will be urged to the right as shown in FIG. 5 against the action of a plurality of compression springs 75.

A piston 76 is formed integrally with the cam disk 39 and is slidably supported in the bore 77 of a distributor 78. The distributor 78 and specifically the bore 77 forms a pumping chamber which communicates with the low pressure chamber 67 through an inlet conduit 79. The head of the plunger 76 is provided with three angular spaced reliefs 81 which cooperate with a delivery port 82 formed at the end of the supply passage 79. Hence, when the plunger 76 is moving to the left, a charge will be drawn into the bore 77 and compressed when the plunger 76 moves to the right. This compressed charge is then delivered through a central bore 83 to one of three delivery passages 84 that are formed in the distributor 78 through supply ports 85 of the plunger 76 at the appropriate angular rotation so as to supply pressurized fuel to the injector 38 of the respective cylinder.

A shutoff valve is operated by a solenoid or the like 86 so as to close the delivery port 82 when it is desired to stop the engine. This solenoid 86 is operated in a suitable and well known manner.

The plunger bore 83 also communicates with a cross-drilled passageway 87 that cooperates with a spill valve 88 so as to control the amount of fuel discharged by varying the timing at which the ports 87 communicate with the low pressure chamber 67. The spill valve 88 is operated by a pivotally supported lever 89 which is, in turn, controlled by a speed control lever 91 through a spring 92. A governor 93 which is operated off of the drive shaft 59 through a gear train 94 operates to complete the speed control. The lever 89 is connected to the spill valve 88 through a coupling 95 that permits rotary movement of the spill valve 88 while controlling its axial position, as is well known in this art.

The point at which fuel injection is begun is controlled by a timing mechanism, indicated generally by the reference numeral 96 and shown in actual position in FIG. 4 and rotated through 90° in FIG. 5 so as to more clearly show the construction. Not all of the construction of the timer 96 is, however, shown in FIG. 5 in that a controlling solenoid 97 and the associated mechanism is deleted in FIG. 5. The controlling solenoid 97 includes a winding 98 that acts on an armature 99 so as to reciprocate a sliding piston 101 that is normally biased to a timing retard direction by means of a coil compression spring 102 contained within a first chamber 103. The chamber 103 is exposed to static pressure on the supply side of the pump through the conduit 63.

The plunger 101 has a connection to a toggle lever 104 which, in turn, is engaged with the carrier ring 74 for rotating the ring 74 in a timing advance direction, the same direction as the rotation of the crankshaft and opposite to the direction of rotation of the drive shaft 59, as the solenoid 97 is operated so as to urge the plunger 101 to the left. It should be understood that the position of the plunger 101 is variable in a linear direction from the fully advanced timing (full left) injection to a fully retarded timing injection (full right).

Figure 10:
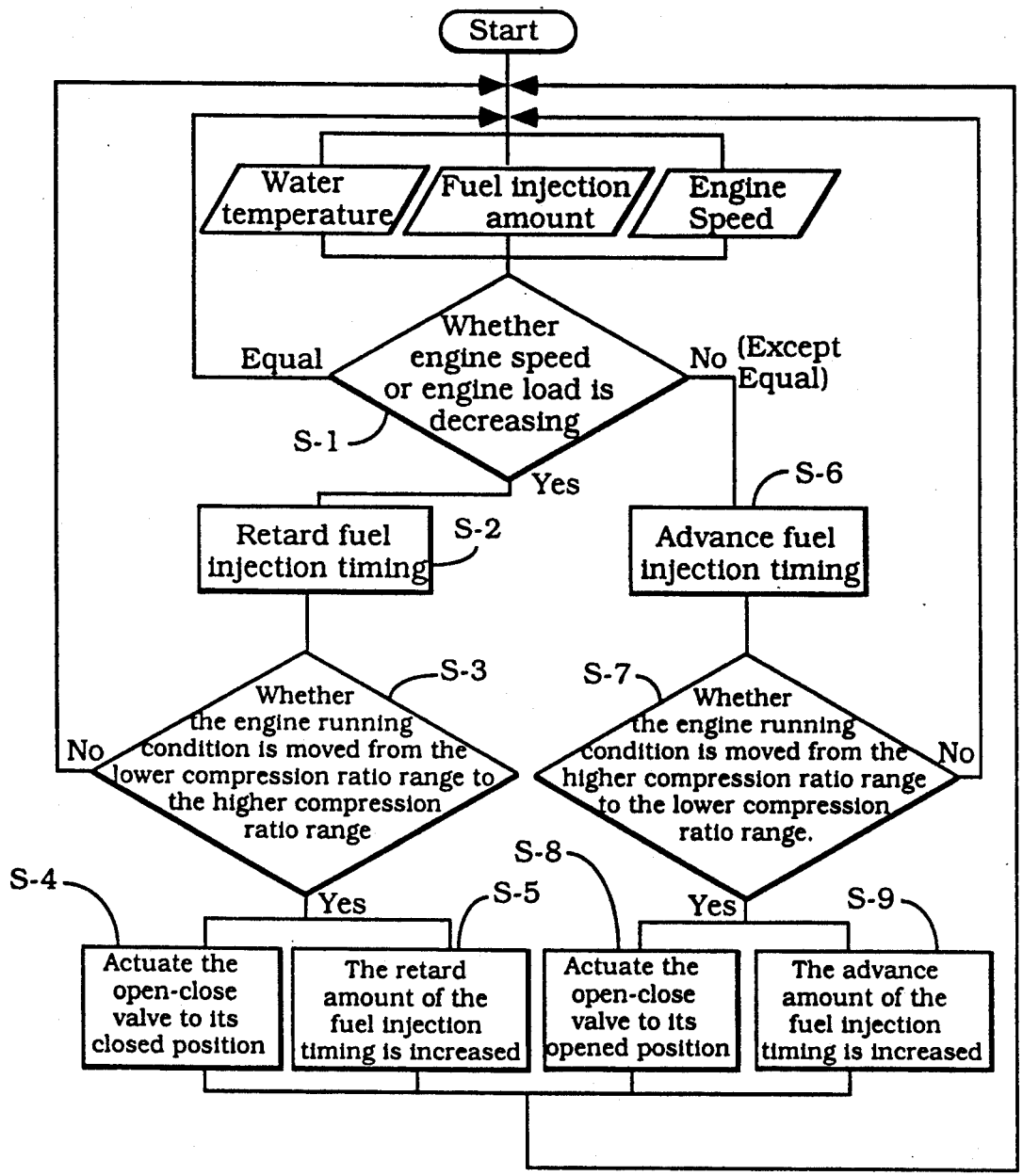
FIG. 10 is a block diagram showing the control routine for varying the compression ratio and injection timing initiation.

Both the exhaust control valves 54 and the timing mechanism 96 are controlled by a CPU, indicated generally by the reference numeral 105 and operating in accordance with a strategy which will be described in conjunction with FIG. 10. This strategy is determined, in accordance with the described embodiment of the invention, in accordance with inputs received from various sensors and specifically an engine speed sensor $S_1$, a fuel injection amount sensor $S_2$ and a water temperature sensor $S_3$. The fuel injection amount determined by the sensor $S_2$ is determined by the position of the spill ring 88. That is, this sensor determines the point at which the port 87 of the plunger 76 is opened back to the low pressure chamber 67 so as to discontinue fuel injection.

Figure 6:
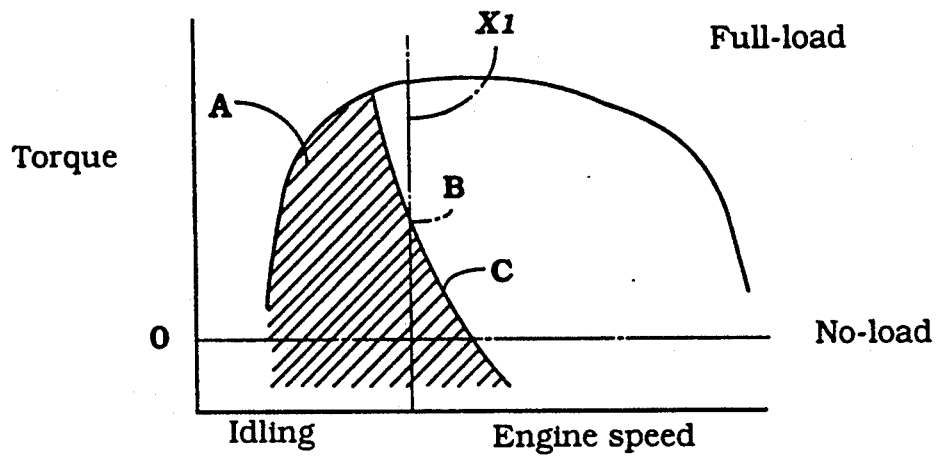
FIG. 6 is a graphical view showing the relationship of torque to engine load and the operational phase of an embodiment of the invention.

FIG. 6 is a torque versus engine speed curve and shows the operating range of the engine when the exhaust control valves 54 are closed in the shaded line portion indicated by the letter A defined by a curve C. This area is determined and the shape of the curve C made experimentally to determine the point in time when it is desirable to reduce the compression ratio so as to improve the stability and output of the engine considering the aforenoted factors. At a given engine speed $X_1$, the point at which the exhaust control valves 54 are operated is determined by the point at which the dot-dash line crosses the curve line C, being the point B in the illustrated embodiment.

Figure 7:
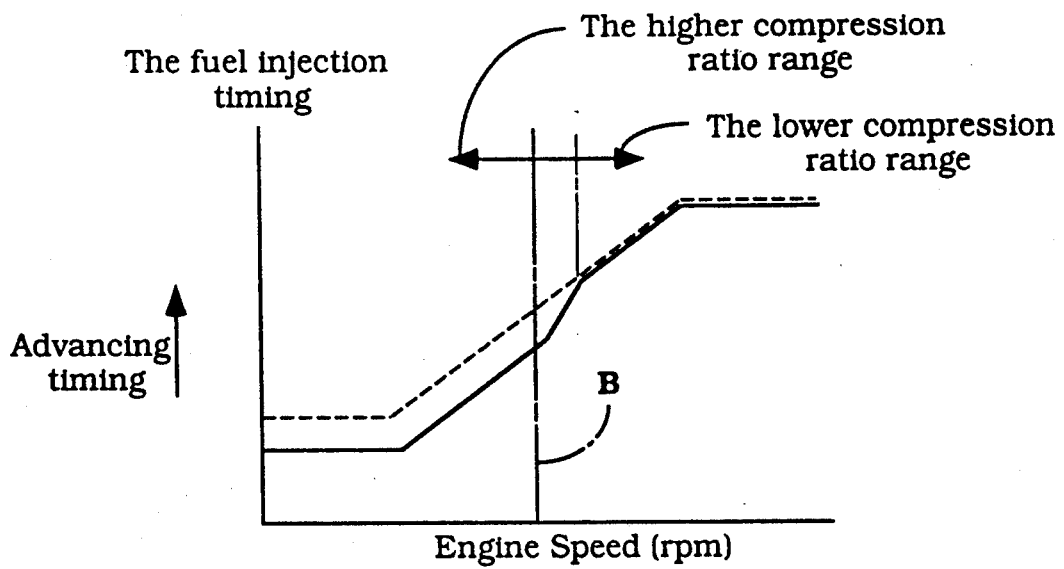
FIG. 7 is a fuel injection timing curve showing the beginning of timing of fuel injection in relation to engine speed under constant load both in accordance with the prior art as shown in the broken line and in accordance with an embodiment of the invention as shown in solid line and when operating at varying speed ratios.

When the CPU 105 determines that the engine is moving into a speed and load condition that the compression ratio may be raised by closing the exhaust control valves 54, the stepping motor 57 is actuated so as to move the exhaust control valves 54 within a preset time interval from their opened position to the closed position as shown in FIG. 3 so as to increase the compression ratio as aforenoted. As may be seen by the dotted line view of FIG. 7, as the engine speed is decreasing with load being held constant, the injection timing is normally retarded from a fixed relatively large advance toward a retarded advance or delayed timing along the sloped part of the curve to a fixed retarded advance which is held at idle and low speeds. However, in accordance with the invention, when it is determined that the exhaust control valve should be operated to be closed at the point B, the CPU 105 outputs a signal to the solenoid 97 to reduce the energization of the winding 98 to effect a further retardation of the injection timing along a further increase sloped portion of the curve so as to provide an additional retardation in injection timing under the condition when the exhaust control valve 54 is closed and the compression ratio is heightened.

Figure 8:
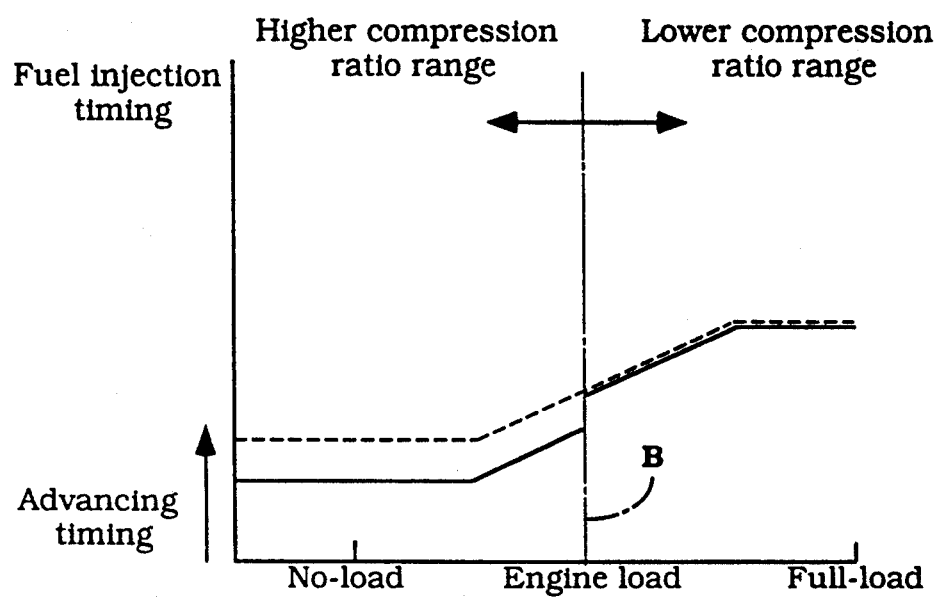
FIG. 8 is a timing advance versus engine load curve showing another operational mode when the engine is operating at constant speed.

FIG. 8 shows the operational curve under the condition when speed is held constant and load is changed. It will be noted that the injection timing is retarded rapidly under this condition to provide an even steeper rate in the retardation of the injection timing. Providing this additional retardation in injection timing has been found to significantly improve the performance by reducing combustion chamber temperatures and, accordingly, the amount of $NO_x$ in exhaust gases. This may be best understood by reference to FIG. 5.

Figure 9:
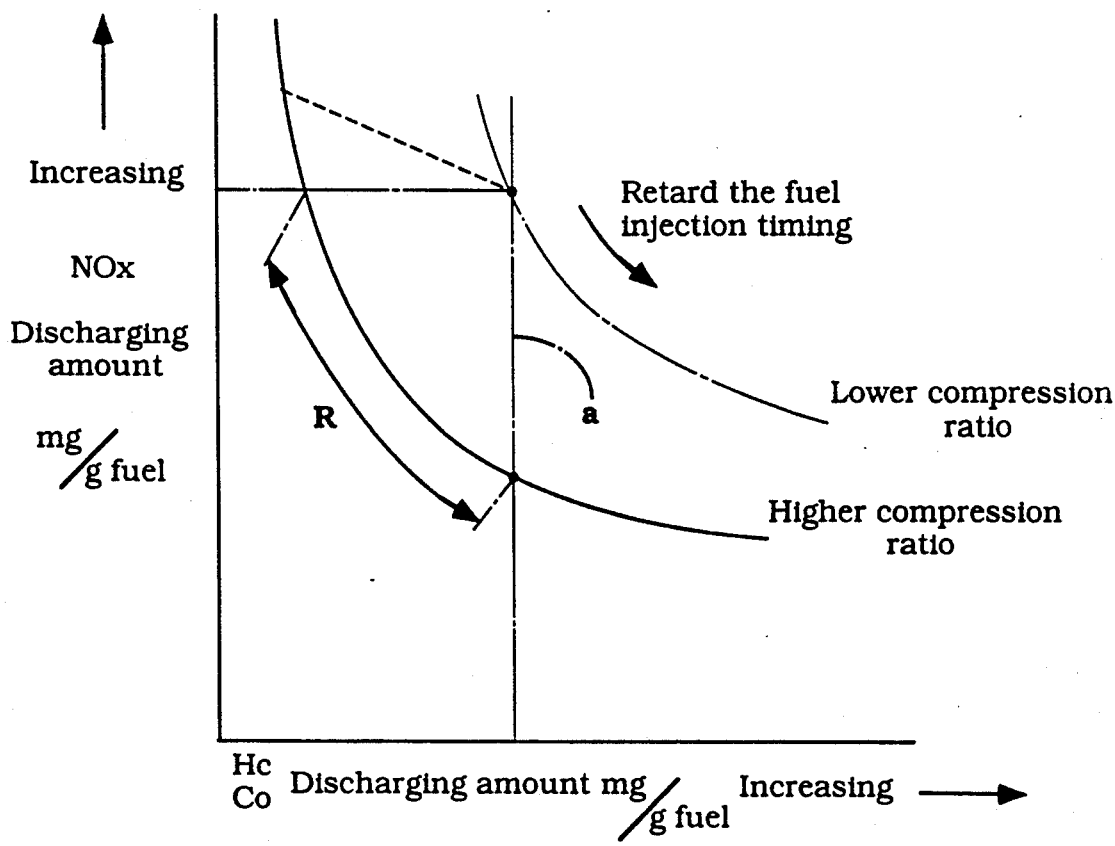
FIG. 9 is a graphical view showing curves of the relationship of hydrocarbon and carbon monoxide emissions and nitrous oxide emissions under the two compression ratios of the instant embodiments.

FIG. 9 shows two families of curves, the high compression ratio curve (solid line) and the low compression ratio curve (dot-dash line) and the relationship of $NO_x$ emissions and hydrocarbon carbon monozide emissions as the injection timing is retarded. It will be seen from each family of curves that as the injection timing is retarded, the amount of hydrocarbons in the exhaust gases and carbon monoxide increases while the amount of $NO_x$ in the exhaust gases decreases. The control strategy controlled by the computer is such so as to provide the spark advance during a portion of the curve where the amount of $NO_x$ emitted in the exhaust gases can be significantly reduced while the amount of hydrocarbons present in the exhaust gases is not significantly changed. For example, considering the broken line curve transversing from the lower compression ratio to the higher compression ratio from a point on the line a (the broken line), it will be seen that the $NO_x$ raise significantly when the compression ratio is lowered and even though the ignition timing is retarded. However, by retarding the ignition timing significantly and instantaneously, it is possible to operate in the range R so that $NO_x$ emissions will be substantially reduced without significantly increasing or even holding constant the amount of hydrocarbons and carbon monoxides emitted in the exhaust gases.

The control routine will now be described by particular reference to FIG. 10. It should be understood that the CPU 105 is preprogrammed with a number of preestablished maps which show the point in engine speed and load conditions when opening or closing of the exhaust control valves 54 is required. The program begins at the starting step and then proceeds to a step so as to measure engine speed, fuel injection amount and water temperature. From these measurements, the program then moves to a step S-1 wherein it is determined whether the engine speed or engine load is decreasing. If there has been no change in engine speed or load determined at the step S-1, the program repeats. However, if the determination at the step S-1 is that the engine speed or engine load has decreased from the previously determined amounts, then the program moves to the step S-2 so as to retard the fuel injection timing in accordance with one of the preprogrammed maps which have been placed into the CPU 105. The maps that are programmed indicate the correct fuel injection timing for the sensed conditions.

The program then moves to the step S-3 to determine if the running condition is gone from a condition where the engine is operating at a lower compression ratio to a condition where the compression ratio can be increased. This is the point B in the previously described embodiment. If a change in compression ratio is not required as determined at the step S-3, the program repeats.

If, however, at the step S-3 the CPU 105 determines that the engine should be running at the higher compression ratio, then the program moves to the steps S-4 and S-5 which are completed simultaneously so as to activate the exhaust control valves 54 to their closed position so as to raise the compression ratio in a predetermined time period, as aforenoted, and to retard the fuel injection timing in a timed manner, as also previously described. The program then repeats.

If at the step S-1 it has been determined that the engine speed or engine load is not decreasing and also is not constant, then the program moves to the step S-6 because this indicates that there is a speed or load increase. In this instance, the fuel injection timing is advanced in accordance with the map strategy of the CPU 105 as aforenoted.

The program then moves to the step S-7 to determine if the engine is running in a condition when the compression ratio should be moved from a high compression ratio to a low compression ratio by opening of the exhaust control valves 54.

If at the step S-7 it is determined that the compression ratio need not be lowered, then the program repeats.

If, however, it is determined that the compression ratio should be lowered at the step S-7, the program then moves to the steps S-8 and S-9 wherein concurrently the exhaust control valves 54 are moved in a predetermined time period to their opened positions and wherein the injection timing is also advanced in this time period. The program then repeats.

Figure 11:
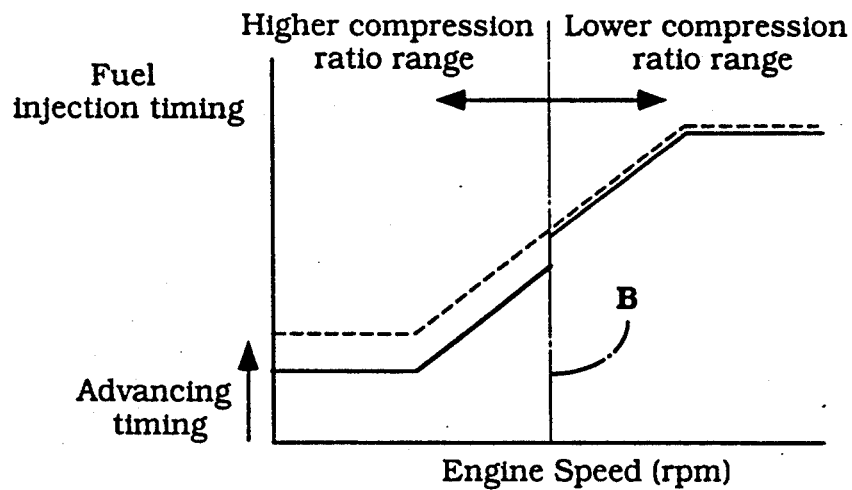
FIG. 11 is a graphical view, in part similar to FIG. 7 and shows another embodiment of the invention.

In the embodiments of the invention as thus far described, the exhaust control valves 54 have been opened or closed in a predetermined time interval and the injection timing advance has been either retarded or advanced in the same time sequence. However, the invention may also be used in conjunction with a system wherein the opening and closing of the exhaust control valves 54 and the advance or retardation of the injection timing by actuation of the solenoid 97 can be done quickly and FIG. 11 shows such an embodiment. Because of the similarity of this embodiment to those previously described, further descriptions of this embodiment are believed to be unnecessary.

It should be readily apparent from the foregoing description that the described embodiments of the invention are highly adaptable in providing good running of a diesel engine under all conditions and at the same time controling the $NO_x$ emissions to acceptable levels. Although several embodiments are illustrated and described, various changes and modifications may be made without departing from the spirit and scope of the invention, as defined by the appended claims.

We claim:

1. A fuel injection system for a diesel engine including means for increasing the compression ratio under low and mid-range speed and load conditions, means responsive to engine speed for retarding the beginning the fuel injection in response to an engine speed reduction, and means for further changing the running condition in response to a change of compression ratio for lowering combustion chamber temperatures and precluding the formation of nitrous oxide.

2. A fuel injection system as set forth in claim 1 wherein the means for reducing the temperature comprises means for increasing the amount of injection retardation when the means for increasing the compression ratio is operated to increase the compression ratio.

3. A fuel injection system as set forth in claim 2 wherein the means for increasing the amount of injection retardation provides a fixed amount of advance during the time when the means for increasing the compression ratio is initially operated to increase the compression ratio and then maintains that additional retardation during later changes in running condition.

4. A fuel injection system as set forth in claim 3 wherein the means for changing the compression ratio and the means for retarding the timing of fuel injection change the compression ratio and retard the timing of fuel injection over a predetermined time period.

5. A fuel injection system as set forth in claim 4 wherein the diesel engine operates on a two-cycle principle.

6. A fuel injection system as set forth in claim 5 wherein the engine has crankcase compression.

7. A fuel injection system as set forth in claim 5 wherein the engine has a prechamber.

8. A fuel injection system as set forth in claim 3 wherein the timing of the injection is retarded instantly.

9. A fuel injection system as set forth in claim 8 wherein the diesel engine operates on a two-cycle principle.

10. A fuel injection system as set forth in claim 9 wherein the engine has crankcase compression.

11. A fuel injection system as set forth in claim 10 wherein the engine has a prechamber.

12. A method of operating a diesel engine comprising increasing the compression ratio under low and mid-range speed and load conditions, retarding the beginning of fuel injection in response to an engine speed reduction, and further changing a running condition in response to the change of compression ratio so as to lower combustion chamber temperatures and preclude the formation of nitrous oxides.

13. A method as set forth in claim 12 wherein the temperature reduction is achieved by increasing the amount of injection retardation when the compression ratio is increased.

14. A method as set forth in claim 13 wherein the amount of injection retardation provides a fixed amount of advance during the time when the compression ratio is changed and then that additional retardation is maintained during later changes in running conditions.

15. A method as set forth in claim 14 wherein the changing of the compression ratio and the retarding of the timing of fuel injection are done gradually in a predetermined time period.

16. A method as set forth in claim 14 wherein the timing of the injection is retarded instantly.

17. A fuel injection system for a diesel engine including means for increasing the compression ratio under low and mid-range speed and load conditions, means responsive to engine speed for retarding the beginning the fuel injection in response to an engine speed reduction, and means for further retarding the beginning of fuel injection for lowering combustion chamber temperatures and precluding the formation of nitrous oxide in response to sensing of a condition which is likely to increase combustion chamber temperature.

18. A fuel injection system as set forth in claim 17 wherein the means for increasing the amount of injection retardation is operative when the means for increasing the compression ratio is operated to increase the compression ratio.

19. A fuel injection system as set forth in claim 18 wherein the means for increasing the amount of injection retardation provides a fixed amount of advance during the time when the means for increasing the compression ratio is initially operated to increase the compression ratio and then maintains that additional retardation during later changes in running conditions.

20. A fuel injection system as set forth in claim 19 wherein the means for changing the compression ratio and the means for retarding the timing of fuel injection change the compression ratio and retard the timing of fuel injection over a predetermined time period.

* * * * *